June 2, 1925.

O. R. HAMMERAS

METHOD OF MAKING MOTION PICTURES

Filed March 3, 1923      3 Sheets-Sheet 1

1,540,213

INVENTOR
Oscar R. Hammeras

BY
ATTORNEY

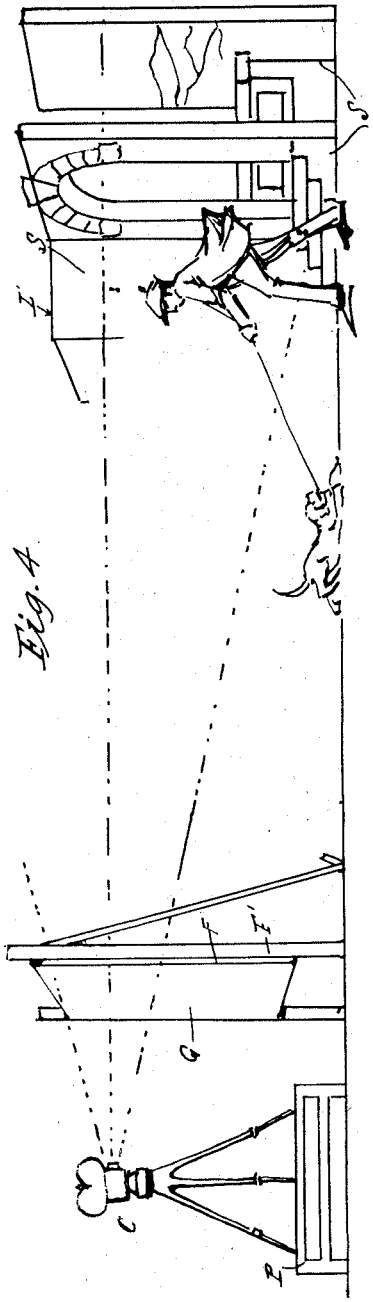
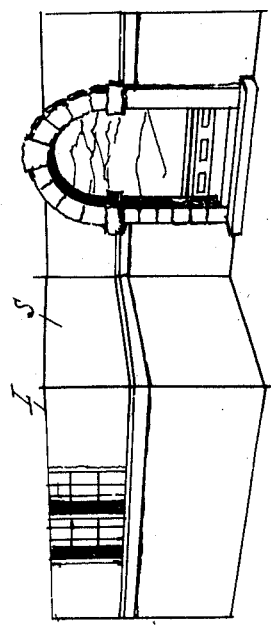
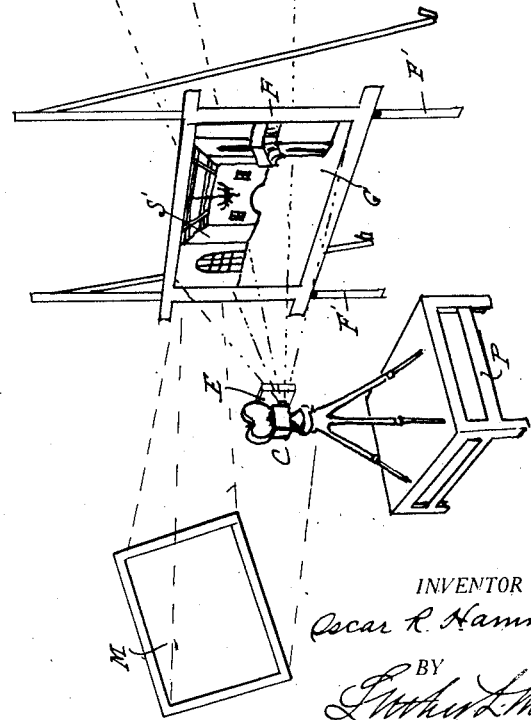

June 2, 1925.

O. R. HAMMERAS 1,540,213

METHOD OF MAKING MOTION PICTURES

Filed March 3, 1923   3 Sheets-Sheet 3

WITNESS:

INVENTOR
Oscar R. Hammeras
BY
*[signature]*
ATTORNEY

Patented June 2, 1925.

1,540,213

UNITED STATES PATENT OFFICE.

OSCAR R. HAMMERAS, OF LOS ANGELES, CALIFORNIA.

METHOD OF MAKING MOTION PICTURES.

Application filed March 3, 1923. Serial No. 622,528.

*To all whom it may concern:*

Be it known that I, OSCAR R. HAMMERAS, a citizen of the United States, and a resident of Los Angeles, in the county of Los Angeles and State of California, have invented new and useful Improvements in Methods of Making Motion Pictures, of which the following is a specification.

This invention relates to methods for making motion pictures, and the principal object is to provide an improved method for making motion pictures which will materially reduce the expense and facilitate the photographing operations, whereby the preparation and arrangement of a large portion of the fixed scenery or "sets" may be dispensed with, while only a relatively small portion of such scenery is necessary in order to make a complete picture.

Another object is to provide an improved method for photographing interior or exterior scenes with natural or artificial scenery, including the use of a transparent element such as plate-glass interposed between the camera and the background whereby that portion of the scene in which the action takes place may be photographed through the transparent element, while complementary scenery may be painted upon said transparent element so as to merge accurately in outline and tone with the natural or artificial scenery for producing a completed scene.

Another object is to provide a method whereby fixed scenery or "sets" for interior or exterior views may be arranged in the background of the picture before which all action is designed to take place, the arrangement of a transparent element at a point near the scenery and in the foreground of the fixed scenery, upon which a continuation of the fixed scenery may be painted, the employment of a color filter or filters for accurately matching the color tones or values on the fixed and painted scenery, and the photographing of the fixed and painted scenery together with the action in a simultaneous and single exposure.

Another object is to provide a method for making pictures which necessitates the use of only a minimum amount of fixed scenery, whether artificial or natural, before which all action is designed to take place, and the provision in the foreground of the fixed scenery of a transparent element having painted thereon scenery of a different character from that which would surround the fixed scenery, the painted scenery being matched accurately in outline and color tone with the fixed scenery so that the fixed and painted scenery may be photographed at a single exposure for providing a composite picture.

It will be understood in the consideration of this invention that it has heretofore been necessary to provide in many cases, highly ornamental and expensive "sets" for interior or exterior scenes, and it is the purpose and primary object of this invention to eliminate this large expense as far as possible or at least to reduce the expense incidental to the taking of pictures to a minimum, without imparing the results.

Usually in the photographing of motion picture scenes the area of the picture in which the action takes place is relatively small, and to this end by employing my improved method it is possible to reduce the amount of fixed scenery to correspond to the area of the picture in which the action takes place.

The interposition between the camera and the fixed scenery of a transparent element such as a plate glass through which the fixed scenery may be viewed from the camera provides means whereby the larger portion of the scenery in a picture may be painted on the glass so as to obscure the background of the fixed scenery, and the portion of the scenery which is painted on the glass will be complementary to the fixed scenery, but of a substantially reduced scale, so that in the photographing operation the outlines of the painted scenery will merge accurately with the outlines of the fixed scenery, also the employment of a color filter which when viewed therethrough reduces both the painted scenery and the fixed scenery to black and white makes it possible for the artist to accurately compare the color values of the painted scenery to the color values of the fixed scenery so that the tones will exactly correspond and merge into each other.

Thus, when a motion picture is taken of the fixed and painted scenery, it will be impossible to differentiate therebetween, and the same result will be obtained as though the entire scene were made from a "set" of artificial scenery or from natural scenery.

It will readily be understood also that by the use of my improved method it is generally possible to obtain much better results and a higher degree of ornamentality than would otherwise be possible.

In the accompanying drawings I have illustrated my improved method of making motion pictures, in which:

Fig. 4 is a diagrammatic view of a set-up, showing the arrangement of the fixed scenery before which all action takes place, the transparent element in the foreground of the fixed scenery, and the camera by means of which the pictures are taken.

Fig. 5 is a perspective view of the fixed scenery, the transparent element in the foreground thereof on which is painted scenery which is complementary to the fixed scenery, the camera by means of which the pictures are taken, and the color filter in front of the camera by means of which the tones and color values are matched.

Preliminary to the consideration of the means of carrying out my improved method it will be understood that I am aware of the issue of a Patent No. 1,372,811 to Walter L. Hall, March 29, 1921, for a method of taking motion pictures, but my method includes certain novel features and steps which constitute distinct improvements over the art, and particularly over the patent of Hall, which I will hereinafter clearly describe.

Referring particularly to Figs. 4 and 5, S represents a "set" of fixed scenery composed of what is usually termed "flats" which may be arranged in any suitable form in a studio in a manner similar to the arrangement of the "sets" on the stage in a theatre. This fixed scenery, however, is adapted to cover and form a background for only such a portion of the scene in which the action takes place, and to this end the height of the "set" S as shown need only be to a point slightly above the heads of the actors. In this case the scenery extends to a point substantially flush with the top of the doorway.

At a suitable distance in front of the fixed scenery S the camera C is mounted on a suitable platform P, if the same is necessary, and in the foreground of the picture at a point near the camera and remote from the fixed scenery S, I provide a transparent element, preferably in the form of a plate glass as at G, which is mounted in a suitable frame F and supported on standards F' at the ends. The glass G is made sufficiently large to accommodate the usual size of picture and the position in front of the camera is such that the scenery to be painted thereon will be of substantially reduced scale as compared with the fixed scenery S.

Figure 1:
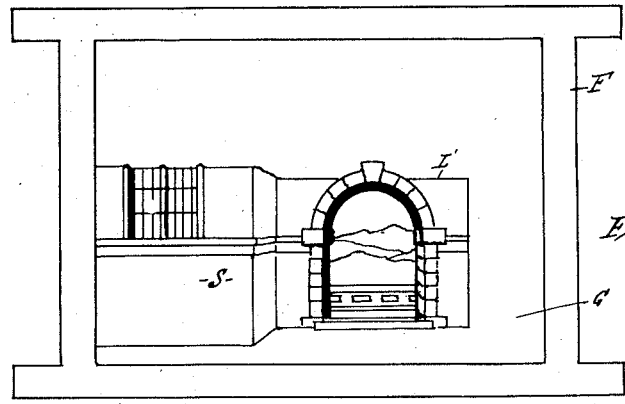
Fig. 1 is a view of a "set" of artificial scenery in the form of an interior, as viewed from the camera through a transparent element.
Figure 2:
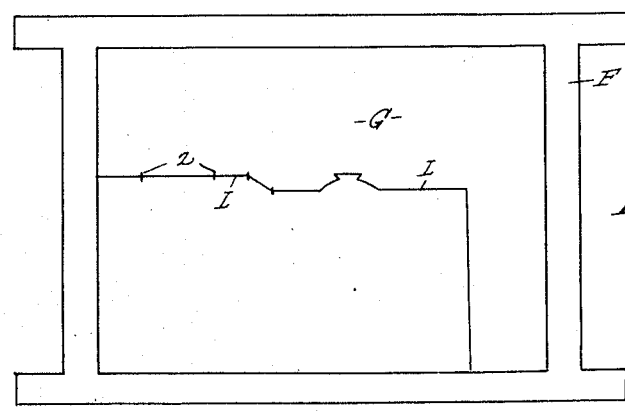
Fig. 2 is a view of the transparent element through which the fixed scenery is viewed, and on which is initially marked the outlines of the fixed scenery as seen in Fig. 1.
Figure 3:
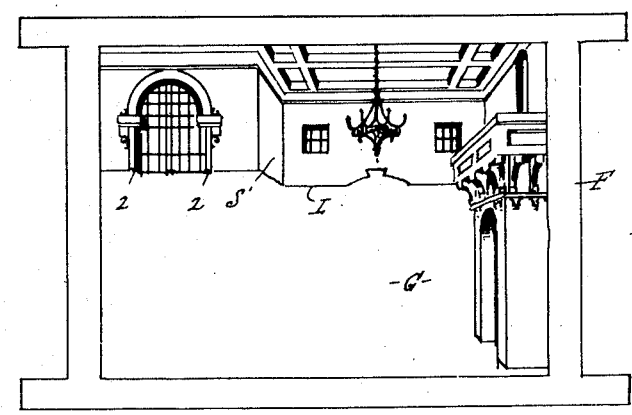
Fig. 3 is a view of the transparent element showing a painting thereon surrounding the outlines of the fixed scenery and forming a continuation thereof for providing a complete scene.
Figure 6:
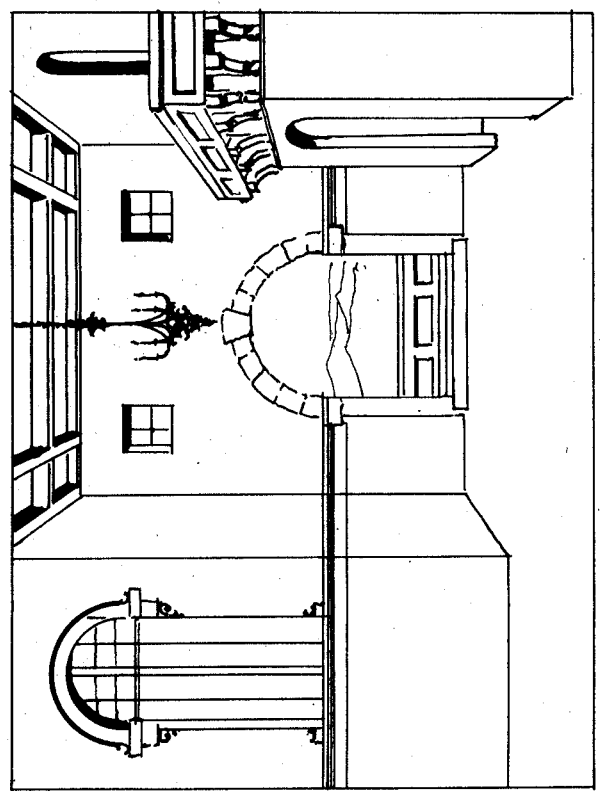
Fig. 6 is a view of a completed scene which is a composite reproduction of the fixed scenery or "set" and the painted scenery.

In the making of a picture the first step in the method consists in the arrangement of the scenery S, the camera C and the glass G in the proper positions, as shown in Fig. 4. Thereafter the margins or outlines of the scenery S are marked upon the glass G by the artist as seen through the camera C, and directed by the camera-man, so that in perspective the marginal line L on the glass, as shown in Fig. 2, will match accurately with the margins L' at the top and sides of the fixed scenery S, when seen through the lens of the camera C. Also points 2, 2, etc., are marked on the marginal line L of glass G to indicate the positions of various features or parts of the scenery S, as seen through the camera, such for instance as the windows, doors, etc., so as to guide the artist in the production of the painted scenery S' which is made on the face of the glass G adjacent the camera C, as shown in Figs. 3 and 5. Thus, after the outlines of the scenery to be painted have been marked on the glass, the artist proceeds to the production of the painted scenery S' on the glass, and this painting is so produced that it will match accurately with the image of the scenery S as seen through the camera C.

Now, it will be noted at this point that the portion of the glass G which corresponds to the visible portion of the scenery S remains unobscured to the views of the scenery S through the camera C, so that the fixed scenery S and the painted scenery S' may be merged together in a single exposure for producing a completed picture of composite character, and that all of the action in such case is designed to take place in the foreground of the fixed scenery S in full view of the camera.

When the painting S' has been produced the artist compares the same with the scenery S by sighting through the camera C and through a color filter E which he may hold in front of the camera so as to properly view the scenery S and S' together, the colors of the two kinds of scenery when viewed through the filter E being reduced to black and white, so that the artist is enabled to compare the color tones or values in the scenery S and S' by properly lighting the scenery S'. Thus, when photographed, the portions of the scenery S' which form continuations of the fixed scenery S will merge with the scenery S, and it will be impossible to determine in the completed picture the junction point between the two kinds of scenery, and the effect in the completed picture will be the same as though the entire scene were made from a "set" or from natural scenery.

It is highly important in carrying out my improved method that the glass G should be flooded with light to the same extent as in a photographing operation, so that the artist before completing the set-up for photographing a given scene will be enabled to obtain by viewing the scenery through a camera the same result as will be produced in the completed photograph.

Any of the well known expedients for producing the light effects now in vogue may be employed in connection with my method, but for the sake of illustration I have shown in Fig. 5 a mirror M which may be suitably positioned with respect to the glass G so as to reflect light on the face of the glass G for the purpose of properly illuminating the glass to determine the density of the colors thereon. In a daylight exposure the sunlight may be reflected from the mirror M, or in a night exposure artificial lights may be reflected thereby, or in lieu of the mirror the artificial lights may be directed by usual methods onto the glass G, but this is not material to my invention.

Figure 7:
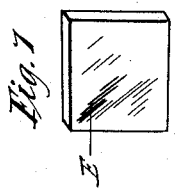
Fig. 7 is a perspective view of a suitable color filter for use in connection with my method.

Now, referring to Fig. 7, the color filter used is a well known form of glass, preferably of a dark blue, which serves to reduce all of the colors when viewed therethrough to black and white or to lights and shadows, so as to reveal the relative density or tone of the several colors.

Figure 8:
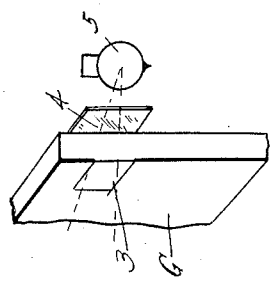
Fig. 8 is a perspective view showing a method of producing light effects through windows, electric lights, and the light.

In Fig. 8 I have shown means for producing light effects through the painted scenery on the glass G. For instance, it is desirable to have the windows in an interior scene such as shown in the drawings appear transparent, and also the lights of a chandelier may be likewise represented. This effect is produced by omitting the paint in the painted portion of the scenery S' from that portion of the scenery which represents the transparent portions of the windows or the corresponding positions on the painted scenery of electric lights, leaving transparencies as at 3 in the glass G at such points.

On the rear of the glass G a semi-transparent sheet of paper as at 4 may be pasted or suitably held in position, and in the rear of the sheet of paper 4 an ordinary electric light bulb 5 may be supported so that the light rays from the lamp 5 will penetrate the paper 4 so as to simulate daylight through the windows or light in the positions of electric lights. In this connection it will also be observed that by turning on and off the lamp 5, the electric lights in a scene of the character shown may be lighted or darkened to simulate the turning on and off of the same, to the same effect as if the lights thus produced were made in a natural manner.

It will be understood that in the use of my improved method only a single exposure is made of a given scene, and this single exposure photographs simultaneously the fixed scenery S, the painted scenery S' and all of the action of the picture, thereby eliminating a multiplicity of exposures for reducing the picture to completeness.

My method also eliminates the necessity for the interposition between the camera and the fixed scenery of ruled screens whereby the outlines of the fixed scenery may be marked on the screen for the reason that by the provision of such screens a number of exposures are necessary to ultimately eliminate the rulings on the screen from a picture.

My method while completely adaptable for exterior views is probably more advantageous in the interior views and in many cases where ornamental "sets" are desired in a picture it is possible to produce the ornamental portions of the scenery on the glass G by painting thereon, instead of building costly ornamental "sets". For instance, the provision of ornamented fixed scenery as at S may require weeks to complete at an enormous expenditure of money, whereas the production of the ornamented portions of the scenery on the glass G would probably require only at the most several hours of work and thus reduce the cost of production to a large extent, and at the same time facilitate the photographing of the scenes and render a materially increased output of the studio.

What I claim is:

1. The method of making moving pictures which consists in placing a transparent sheet of material in the foreground of a "set" of fixed scenery, marking on the transparent element the outlines of the fixed scenery, painting on the transparent element scenery which is complementary to the fixed scenery, and photographing the painted scenery on and the fixed scenery through the unpainted portion of the transparent element in a single exposure.

2. The method of making motion pictures which consists in placing a transparent sheet of material in the foreground of a "set" of fixed scenery, marking on the transparent element the outlines of the fixed scenery, painting on said transparent element externally of said markings scenery which is complementary to and forms a continuation of the image of said fixed scenery when viewed through a camera, and finally photographing the fixed scenery and the painted scenery in a single exposure.

3. The method of making motion pictures which consists in placing a transparent screen in the foreground of a set of fixed scenery, viewing said fixed scenery through a camera and through said transparent element, marking on a reduced scale the outlines of said fixed scenery on said transparent element, painting scenery on said transparent element externally of the marked outlines of said fixed scenery, causing action to take place in the foreground of said fixed scenery and photographing the action and said fixed scenery through the unpainted portion of said transparent element and the painted scenery on said transparent element in a single exposure.

4. The method of making motion pictures which consists in arranging a "set" of artificial scenery in front of the camera, placing a transparent sheet of material in the foreground of said "set" and also in front of the camera, sighting through said camera and said transparent element, marking the outlines of said "set" on a reduced scale on said transparent element, painting scenery on said transparent element so as to match with and form a continuation of said fixed scenery when viewed through the camera, said painted scenery being on a reduced scale, placing a color filter between the camera and said transparent element for matching the color values in the painted and set scenery, and thereafter removing said color filter and photographing the painted and set scenery in a single exposure.

5. The method of making motion pictures which consists in arranging a "set" of artificial scenery in front of the camera, placing a transparent sheet of material in the foreground of said "set" and also in front of the camera, sighting through said camera and said transparent element, marking the outlines of said "set" on a reduced scale on said transparent element, painting scenery on said transparent element so as to match with and form a continuation of said fixed scenery when viewed through the camera, said painted scenery being on a reduced scale, placing a color filter between the camera and said transparent element for matching the color values in the painted and set scenery, causing action to take place in front of the set scenery, and thereafter removing said color filter and photographing the action and the set scenery through the unobscured portion of said transparent element and the scenery on said transparent element in a single exposure.

6. The method of making motion pictures which consists in supporting a transparent element between the camera and a natural or artificial scene, viewing the scene through the camera and said transparent element, marking certain points in the scene, thus viewed on the face of the transparent element, painting on a portion of said transparent element scenery complementary to the scenery visible through the unobstructed portion of said transparent element, thereby obstructing a portion or portions of the natural or artificial scenery, and photographing the natural or artificial scenery through the unobstructed portion of said transparent element and the scenery on said transparent element in a single exposure.

7. The method of making motion pictures which includes placing a "set" of artificial scenery in the background of the picture, placing a transparent element in the foreground of the picture, painting scenery on a portion of said transparent element complemental to said artificial scenery when viewed through the camera, providing transparencies in said painted portion, placing semi-transparent sheets of material on the rear side of and for covering said transparent element, and directing artificial lights on said semi-transparent material and thereafter photographing the artificial and painted scenery in a single exposure.

OSCAR R. HAMMERAS.

Witnesses:
J. P. BURROWS,
LUTHER L. MACK.